US 12,195,859 B2

(12) United States Patent
Arosio et al.

(10) Patent No.: US 12,195,859 B2
(45) Date of Patent: Jan. 14, 2025

(54) METHOD TO PRODUCE HIGH CORROSION AND WEAR RESISTANT CAST IRON COMPONENTS BY WATER JET SURFACE ACTIVATION, NITROCARBURIZATION AND THERMAL SPRAY COATING

(71) Applicant: Oerlikon Surface Solutions AG, Pfäffikon, Pfäffikon (CH)

(72) Inventors: Franco Arosio, Bad Saeckingen (DE); Rolf Heinecke, Baddeckenstedt (DE); Hossein Najafi, Anglikon (CH)

(73) Assignee: Oerlikon Surface Solutions AG, Pfäffikon, Pfäffikon (CH)

( * ) Notice: Subject to any disclaimer, the term of this patent is extended or adjusted under 35 U.S.C. 154(b) by 24 days.

(21) Appl. No.: 17/768,000

(22) PCT Filed: Oct. 9, 2020

(86) PCT No.: PCT/EP2020/078494
§ 371 (c)(1),
(2) Date: Apr. 11, 2022

(87) PCT Pub. No.: WO2021/069712
PCT Pub. Date: Apr. 15, 2021

(65) Prior Publication Data
US 2024/0084430 A1    Mar. 14, 2024

Related U.S. Application Data

(60) Provisional application No. 62/912,871, filed on Oct. 9, 2019.

(51) Int. Cl.
*C23C 4/02* (2006.01)
*C23C 8/02* (2006.01)
(Continued)

(52) U.S. Cl.
CPC .............. *C23C 4/02* (2013.01); *C23C 8/02* (2013.01); *C23C 8/32* (2013.01); *F16D 65/0025* (2013.01); *F16D 65/125* (2013.01); *F16D 65/127* (2013.01); *F16D 2200/0013* (2013.01); *F16D 2250/003* (2013.01); *F16D 2250/0046* (2013.01)

(58) Field of Classification Search
CPC .... C23C 4/02; C23C 8/02; C23C 8/32; F16D 2200/0013; F16D 2200/003
See application file for complete search history.

(56) References Cited

U.S. PATENT DOCUMENTS

2004/0074979 A1    4/2004  McGuire

FOREIGN PATENT DOCUMENTS

DE    102014006064 A1    6/2015
DE    102014015474 A1    4/2016
(Continued)

*Primary Examiner* — Jessee R Roe

(57) ABSTRACT

The invention relates to a method of producing a corrosion resistant coating system on a cast iron substrate preferably in the shape of a brake disc, the coating system being completed by a thermally sprayed top layer, characterised in that the cast iron substrate is first subjected to activation by means of a pulsed water jet after completion of machining which increases the surface roughness of the surface thus treated, whereupon the surface is nitrocarburized so that a corresponding diffusion layer is formed on it, whereupon the surface is subjected to an oxidation process in a next step and only then the top layer is applied by thermal spraying.

5 Claims, 3 Drawing Sheets a)

Figure 1:
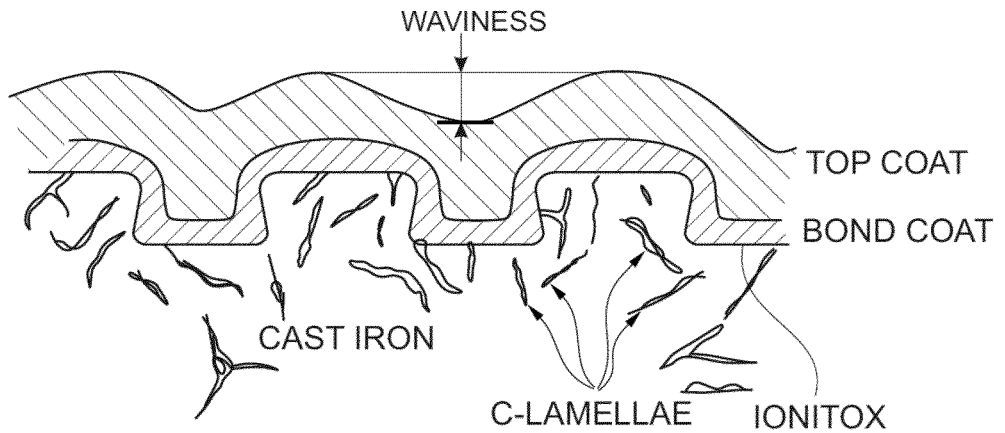
Figure 1:
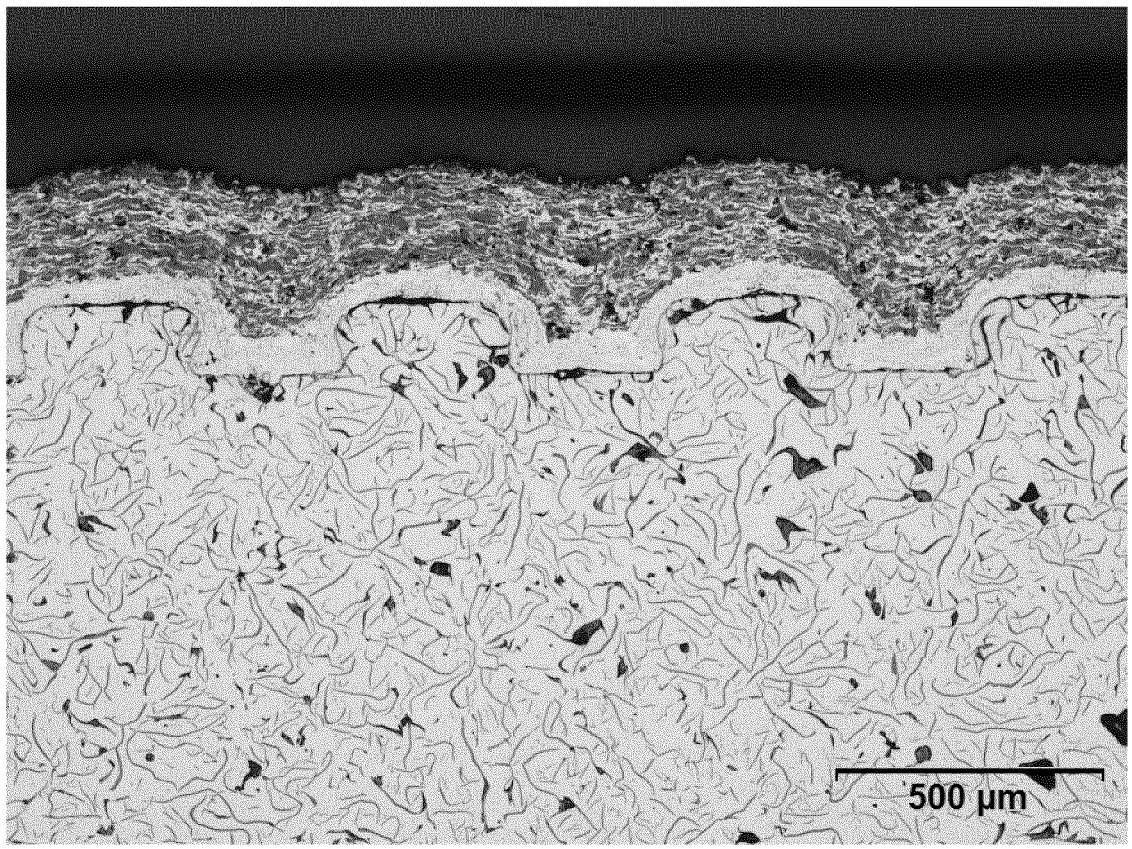

(51) Int. Cl.
*C23C 8/32* (2006.01)
*F16D 65/00* (2006.01)
*F16D 65/12* (2006.01)

(56) References Cited

FOREIGN PATENT DOCUMENTS

| JP | 2013509306 A | 3/2013 |
|----|--------------|--------|
| WO | 2015135639 A1 | 9/2015 |
| WO | 2015188918 A1 | 12/2015 | a)

b)

a)

b)

Figure 3

| Scenario | Surface activation | Bond Coat (BC) | Top Coat (TC) | Adhesion (Mpa) |
|---|---|---|---|---|
| Standard solution | State of the art Mechanical | Diamalloy1005/ HVOF/ 60 µm | Metco60002/ APS/ 220 µm | 28 - 32 |
| Inventive solution | Water-jet activation (Rz: 120 µm) | Diamalloy1005/ HVOF/ 60 µm | Metco60002/ APS/ 150 µm | 30-42 |

METHOD TO PRODUCE HIGH CORROSION AND WEAR RESISTANT CAST IRON COMPONENTS BY WATER JET SURFACE ACTIVATION, NITROCARBURIZATION AND THERMAL SPRAY COATING

TECHNICAL BACKGROUND

The application of coatings or surface modification of iron-based or steel components used for example in automotive industries, such as cast iron brake discs or sliding components in order to improve the wear and corrosion resistance is well known.

Thermal spraying has been described elsewhere, see for example DE 10 2014 006 064 A1 here to be used for the coating of brake discs.

Production of diffusion layers using gas nitrocarburizing and oxidation (GNC+OX) on brake discs are also known to improve the wear and corrosion resistance of the brake disc.

Requirements from the market are longer life brake discs which is achieved by increasing the corrosion and wear resistance of the brake discs. This means that the corrosion resistance which was acceptable in the past as state-of-the-art has now to fulfill requirements which are now stricter.

Problem Underlaying the Invention

The objective of the invention is to provide a method to produce a component with a corrosion and wear resistant coating which shows improved properties as compared to the prior art.

Solution According to the Invention

According to the present invention, this problem is solved by the following method:

A corrosion resistant coating system is produced on a cast iron substrate preferably in the shape of a brake disc. The coating system is completed by a thermally sprayed top layer which provides for the required wear resistance. According to the invention the cast iron substrate is first subjected to activation by means of a pulsed water jet after completion of machining, if a machining is provided for. That way the surface roughness of the surface thus treated is increased so that the bonding of the later thermally sprayed material is improved. Hereinafter the surface is nitrocarburized so that a corresponding diffusion layer is formed on it. The diffusion layer coming into existence that way forms a base with an increased wear resistance giving itself firm hold and a strong base to the thermally sprayed top layer. In particular this diffusion layer makes the thermally sprayed top layer insensitive to local damage, as it inevitably may occur if—for example—a hard particle is located in the gap between brake pad and brake disc before the activation of the brake begins. Thereupon the surface is subjected to an oxidation process in a next step, which means that the surface or a part of the diffusion layer is oxidised (including the more than insignificant formation of $Fe_3O_4$). The said oxidation provides for a remarkable improvement in regard to corrosion resistance since it inhibits "under-corrosion" of the sprayed top layer. Finally, the top layer is applied by thermal spraying. The layer thickness of the top layer is chosen to be large enough to allow for the top layer to cover and close (i.e. fully "bridging") the cut cavities or lamellae which are fully or partially filled by graphite. Moreover the layer thickness of the top layer is chosen large enough so that it covers the high surface roughness produced by the water jet in a way that it is not detrimental for the application, such as it does not deteriorate the braking properties, for example.

Preferred Options to Improve the Invention

Ideally the pulsed water jet is loaded or superimposed by ultrasound in such a way that cavitation beads are formed in the water jet, whereas the ultrasound "load" is tuned such that the beads are thrown against the surface to be treated, implode there and increase that way the surface roughness.

Preferably the ultrasound is tuned in such a way that at least a part of the cavitation beads are small enough to increase the sub-surface roughness. Such an optimal tuning of the ultrasound "load" has the effect to increase the roughness of the sub-surface roughness. As a sub-surface roughness, all such surface marks and surface indentations are defined to have a maximum extension along the surface of less than 1 µm. Such a tuning of the ultrasound is not too cumbersome but needs some practical tests, with subsequent optical analysis of the cross-section of the surface produced that way and whether the actual change of "sound energy" or ultrasound "load" has the tendency to go in the right direction or not has to be evaluated. Increasing the sub-surface roughness means increasing the surface which is offered to the thermally sprayed material for "clamping" firmly, i.e. bonding into the carrying base.

Preferably the water jet is blasted at an angle of about 90° against the surface to be treated. Of about 90° means here in every case 80° to 100° but preferably 86° to 94°. That way the capacity of the water jet to carve out all those parts/components/crystallites of the cast iron surface, which are not optimally bound to the surrounding surface material, is used at the optimum performance.

It is highly preferred that the water jet is adjusted and guided over the cast iron surface to be treated with such a dwell time that the water jet creates localized depressions/cavities in the surface at intervals, which have consequently an undercut. It is important to point out that the water jet produces such depressions with undercuts which are not coming essentially by emptying the cut cavities which previously filled by the graphite lamellae. Instead, most of the depressions produced will "genuinely" be carved into the surface by the water jet itself which has such a high kinetic energy and produce a high impact on the surface that it removes, literally "bombs out", the weaker zones of the cast material.

If such a depression has an undercut can be answered by the following imaginary test and has to be answered by "no":

Imagine that the depression to be assessed has been completely filled by fluidal material which has become solid afterwards, forming afterwards a solid "plug". Would it be possible to find one axis along which the solid plug can be fully pulled out of the cavity without breaking away something from the solid pug?

Such undercuts, if any, will later be filled by the splats, i.e liquid droplets from the thermally sprayed material and which gives afterwards an extremely good adhesion as soon as the thermally sprayed material is solidified.

It is highly preferred that substrate is a brake disc and in particular the brake surface of a brake disc.

As general first embodiment we describe as follows:

Applying a mechanical surface activation on at least a part of the surface of the component, such as for example a brake disc, using a water jet process, preferably a pulsed water jet process, in order to produce microstructures which are equally distributed on the surface, that is coated afterwards using a thermal spray process, wherein the microstructures comprise undercuts. These undercuts comprise sub-surface roughness which increase the adhesion of the thermally sprayed coating to the component. The iron-based component is nitrocarburized for forming an interlayer of carbonitride.

In order to further improve the component, an additional step of oxidizing after nitrocarburizing can be performed to form a continuous oxide coating on top of the carbonitride interlayer.

Then a thermally sprayed top coating comprising a cermet with at least an oxide ceramic and a metal-based material is produced.

In order to further improve the component, an additional step of oxidizing after nitrocarburizing and prior to the thermal spray process can be performed to form a continuous oxide coating on top of the carbonitride interlayer.

Optionally, prior applying the thermally sprayed top coating, applying an additional intermediate layer (bond coat) by thermal spraying in order to improve the adhesion of the top coating to the component, wherein the intermediate layer comprises a metal-based material.

FIG. 1a) shows a thermally sprayed coating system comprising a bond coat and top coat and the nitrocarburizing+ oxide layer over a state-of-the-art mechanically activated surface having a typical "dovetail" structure which is known to improve the adhesion of thermally sprayed coating.

FIG. 1b) shows the corresponding cross-section of a real component with one of the state-of-the art surface activation and coating system.

Figure 2:
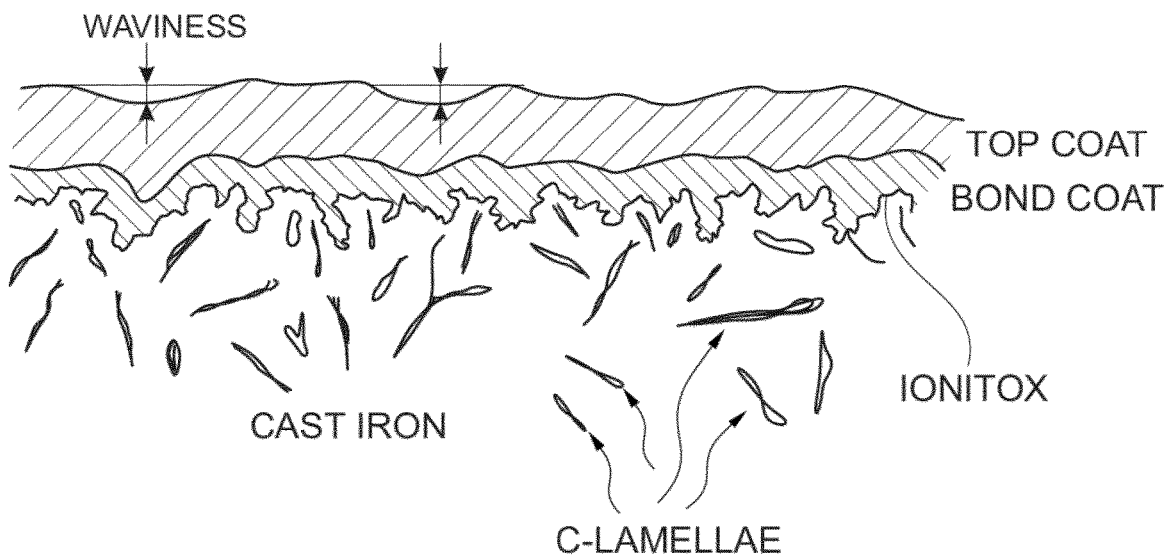
Figure 2:
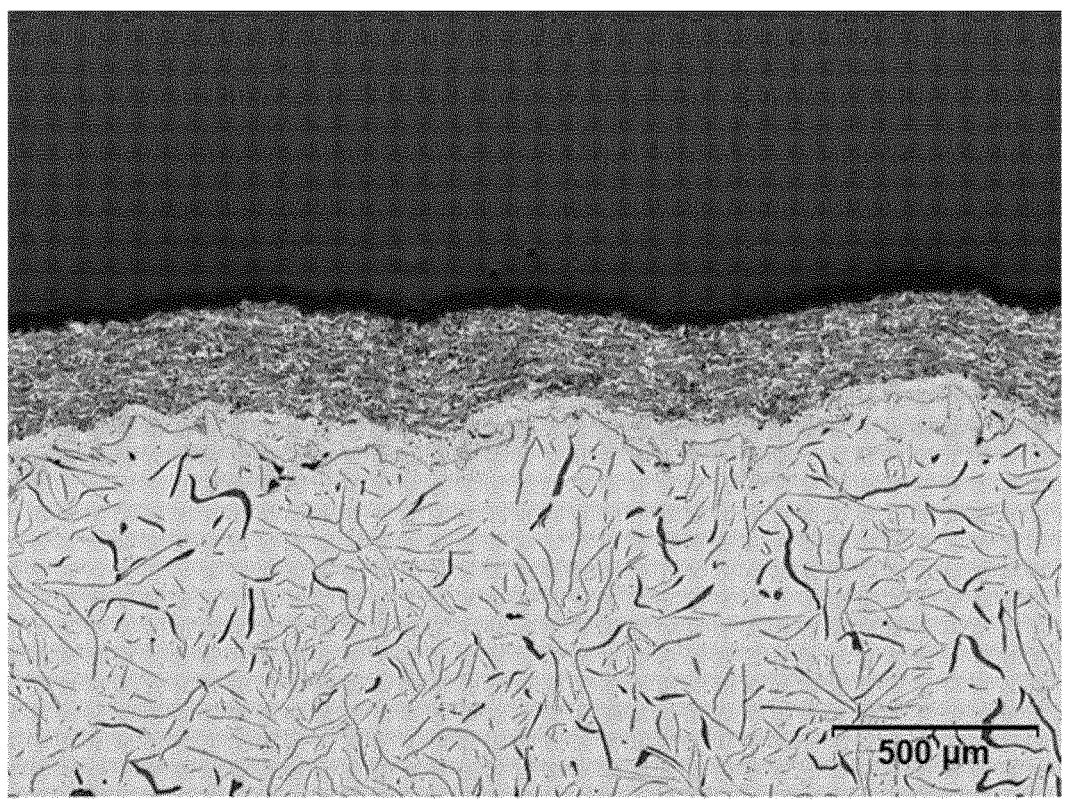

FIG. 2a) shows the thermally sprayed coating system and nitrocarburizing+oxide layer over a pulsed water jet activated surface which reveals the specific microstructure having undercuts and sub-surface roughness which allow reducing the "waviness" of the top layer and at the same time increasing the adhesion of the thermally sprayed layer on the substrate.

As can be seen the black line separating the cast iron substrate from the bond coat is not shown as smooth line but in itself comprise small ripples which represent said sub-surface roughness. Same can be seen on FIG. 2b)

FIG. 2b) shows the corresponding cross-section of a real component with the inventive solution.

As can be seen in FIG. 2a) the black line separating the cast iron substrate from the bond coat is not shown as smooth line but in itself comprise small ripples which represent said sub-surface roughness. Same can be seen on FIG. 2b)

FIG. 3 shows adhesion measurements results which are conducted on standardized sized samples using the ASTM C 633 Adhesion or Cohesive Strength of Flame-Sprayed Coatings. The adhesion of the coating system using state of the art mechanical activation and the GNC OX+thermal spray coating increases from 28-32 MPa to 30-42 MPa when the standard mechanical activation is replaced by the inventive pulsed water jet surface activation (see second row in the table of FIG. 3)

Note that in the sense of this description, pulsed fluid jet does not include grit blasting using sand or other powder as medium because this has its disadvantages that some undercuts can be produced, but then particles get trapped in the undercuts, which have negative effects on the wear and corrosion resistant coating.

DESCRIPTION OF THE PREFERRED EMBODIMENT

In the preferred embodiment the iron-based component is a cast iron brake disc which has a thermally sprayed coating on at least a part of the main exposed surfaces of the disc, including the outer edges of the said surfaces.

The brake disc is initially finely mechanically turned in order to reach the adequate Disc Thickness Variation (DTV) and Lateral Runout (LRO) as known from the state-of-the-art. These primary mechanical finishing methods allow to reduce the chatter and judder of the brake disc during operation which are the main cause of brake disc failures. Additionally, the mechanical finish allows reducing the thickness of material to be grinded afterwards, improves the homogeneity and precision of the coating thickness distribution, which consequently will have a positive influence on the mechanical properties of the coating, such as hardness, tensile strength, porosity, among others.

Afterwards the surfaces of the brake disc that are thermally coated undergo a mechanical activation by a pulsed water jet process. The water jet activation method, described elsewhere (EP2741862B1), consists mainly of a high frequency pulsed high pressure water jet process, which allows controlling of the surface roughness and microstructure produced on the surface of the brake disc. The main parameters include the frequency of the pulse, which ranges from 10 kHz to 50 kHz, preferably at about 20 kHz, pressure of the water jet, between 550 and 800 bar, preferably between 600 and 700 bar. During the surface activation, the nozzle of the water jet system is set at a distance to the substrate between 25 and 60 mm, preferably 30 to 40 mm.

In case of treating a brake disc's friction surface and also often in case of treating the whole brake disc, too, the movement of the spot where the water jet impacts the surface is set in such a way that it advances in radial direction seen in regard to the axis around which the brake disc rotates at the same time. It is quite important to choose a proper relative movement and movement speed of the impact zone with respect to the surface of the brake disc. It is hard to give absolute values at this stage. However, what should be kept in mind is that the relative movement speed determines how often a surface area will be hit by the water jet during the treatment. Therefore, relative movement of the water jet and relative movement speed of the water jet with respect to the surface and relative to the rotation speed of the brake disc is of high importance to achieve the desired surface roughness and surface roughness distribution. An important "lighthouse parameter" to characterize the surface are the roughness Rz (peak to peak) and Ra (average roughness). The relative movement speed should, in general, be chosen in such a way that the surface test indicates that the roughness Rz is around 100 μm. Some tolerance is admitted. In simplest case we talk about a tolerance of about +/−20%, more preferably the tolerance is about +/−10%. In other cases, it can be sufficient that Rz is not too small and below 85 to 90 μm. The value of Ra should be approximately identical or ideally be within the same ranges defined above for Rz.

The averaged roughness depth Ra is the average of the individual roughness depths of five consecutive individual measurement sections in the roughness profile. In each measuring section the extreme values are added to a span and divided by the number of measuring sections.

The measurement of Rz and Ra are standardized values. The measurement undertaken here has to comply with the DIN-ISO Standard applicable at the filing day. At this point please see DIN-ISO 25178, The above process results in producing compression residual stress on the surface, which densifies the surface of the brake disc, allows eliminating of the superficial carbon lamellae that are present from the cast process and produces of a predefined wanted surface roughness, which is characterized by a Rz value in the range of 90 to 150 µm, preferably at about 125 µm and a corresponding Ra value characterized by the ratio Rz/Ra of preferably at least 5 or above.

After the mechanical surface activation, the brake disc is going through a heat treatment process at temperatures of approximately 500° C. to 590° C., preferably between 570° C. to 580° C. and is subsequently subjected to a nitrocarburization process in a controlled atmosphere, usually at a pressure close to the atmospheric pressure of about 1030 mbar), and exposed to gases such as ammonia, nitrogen and carbon dioxide. The respective gas flows are adapted depending on the cast iron base material and weight of the brake disc component. The nitrocarburization process is favorable for iron-based material as it forms a harder material of Fe—NC over the whole exposed surfaces of the component. The component afterwards is cooled down at a lower temperature of about 500° C. where it can optionally go through a plasma activation process at work pressures below 2 mbar, preferably between 1 to 2 mbar or directly through the additional optional oxidation process. The optional plasma activation process is described more in detail elsewhere (U.S. Pat. No. 5,679,411A), whereas the whole process including the latter process of additional oxidation is better known as gas nitrocarburization and oxidation or GNC OX. The optional plasma activation allows an additional cleaning of the surface by sputtering and also sputter-ions produced during this process create lattice defects on the surface which contribute to a final denser oxide layer after the oxidation process. The resulting nitrocarburizing layer or diffusion zone are at least 15 µm thick and the oxide layer at least 2 µm. The additional optional thin oxide layer of magnetite ($Fe_3O_4$) is a continuous and a closed layer which is produced over the whole component surface, allowing an improved corrosion resistant of the component.

Since the nitrocarburization process does not change the microstructure produced by the pulsed water jet surface activation process, the iron cast brake disc can be coated by the thermal spray process directly afterwards without any necessary additional pre-treatment.

Application of the Thermal Spray Coating

Bond Coat, for example by High Velocity Oxi-Fuel (HVOF):

An intermediate layer is applied between the top coat and the Ionit OX layer consisting of a nickel-based alloy, preferably of a nickel-chromium alloy, or of the Fe-based alloy by HVOF and or APS process. The range of gases in HVOF process could be oxygen: 100-400 NLPM and secondary gas: 300-800 NLPM (Normal Lister per Minute). The spray distance is the range of 55 to 450 mm, depending if HVOF or APS process.

The Bond coat may have a thickness in the range of 30 to 120 microns. The intermediate layer serves to compensate the different thermal expansion coefficient of cast iron substrate and top coat, quasi as an elastic compensating.

Porosity <3%

Top Coat for Example by APS

A top coat is applied on top of the BC by APS process or by other thermal spray process. It consists of an oxide ceramic and a Fe-based material. The fraction of oxide ceramic (for example one of the elements or a combination hereof Component B of the table) could be between 30-70 wt %. The range of gases in APS process could be Argon: 20-150 NLPM and secondary gas: 1-20 NLPM. The spray distance is in the range of 55 to 270 mm.

The thickness of the cermet coating layer is in a range of 100 to 500 microns.

Porosity: <5%

The following table shows another bond coat herein called Component A.

Component B is the ceramic part of the cermet composition for the top coat.

| A chemical analysis of a representative sample of the blend components shall show the following limits: | | |
| --- | --- | --- |
| | Specification Required [wt. %] | |
| Element | min | max |
| Component A) | | |
| Iron (Fe) | Balance | |
| Chromium (Cr) | 26 | 31 |
| Molybdenum (Mo) | 3 | 5 |
| Niobium (Nb) | 0.2 | 1.0 |
| Nickel (Ni) | — | 0.2 |
| TAO | — | 3 |
| Component B) | | |
| Al2O3 | Balance | |
| TiO2 | 1 | 5 |
| SiO2 | — | 3.0 |
| Fe2O3 | — | 2.0 |
| TAO | — | 1.0 |

According to a preferred embodiment, a final step of grinding is performed in order to achieve a finish with the required end geometrical tolerance of the brake disc, such as the DTV, LRO and planarity. Since the brake disc surface will be subjected to friction with the braking pads, the surface has to have a low roughness, ideally below Rz<10 µm.

Miscellaneous

Beside to what has been claimed by now protection is also sought for the following:

A method to produce a corrosion resistant coating system onto a cast iron substrate, wherein the coating system comprises at least a thermally sprayed top layer, wherein prior to applying the top layer the substrate is treated to produce at least a nitrocarburizing diffusion layer into the substrate, characterized in that prior to to establishing the nitrocarburizing diffusion layer, the surface of the substrate is mechanically activated by a pulsed fluid jet process in order to produce an equally distributed surface roughness comprising undercuts and within the undercuts a sub-surface roughness which favors the mechanical adhesion of the thermally sprayed coating.

The invention claimed is:
1. A method of producing a corrosion resistant coating system on a cast iron substrate in the shape of a brake disc, comprising:
   first subjecting the cast iron substrate to activation with a pulsed water jet after completion of machining which increases a surface roughness of a surface of the cast iron substrate thus treated,
   nitrocarburizing the surface so that a corresponding diffusion layer is formed on the surface, subjecting the surface to an oxidation process in a next step, and then applying a top layer to the surface by thermal spraying.

2. The method according to claim 1, wherein the pulsed water jet is exposed to ultrasound in such a way that cavitation beads are formed in the water jet, wherein the water jet is tuned such that the beads are thrown against the surface to be treated and implode against the surface, thereby increasing the surface roughness.

3. The method according to claim 2, wherein the ultrasound is tuned in that way such that at least a part of the cavitation beads are small enough to increase a sub-surface roughness.

4. The method according to claim 1, wherein the water jet is blasted at an angle of about 90° against the surface to be treated.

5. The method according to claim 1, wherein the water jet is adjusted and guided over the surface to be treated with such a dwell time that the water jet creates localized depressions in the surface at intervals, which have an undercut.

* * * * *